United States Patent Office 2,998,987
Patented Sept. 5, 1961

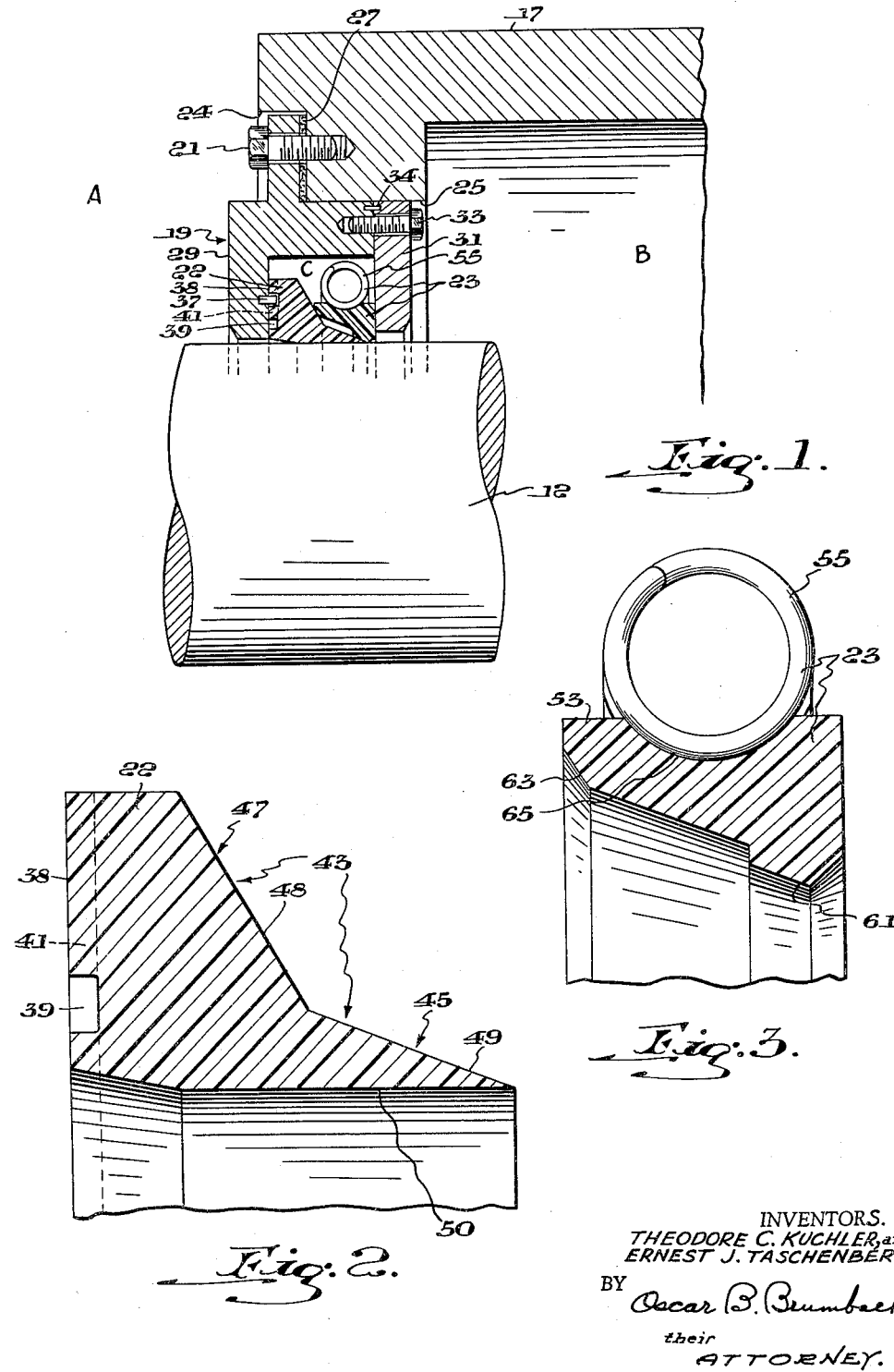

2,998,987
TEFLON LIP SEAL
Ernest J. Taschenberg and Theodore C. Kuchler, Baltimore, Md., assignors to Koppers Company, Inc., a corporation of Delaware
Filed Jan. 30, 1958, Ser. No. 712,247
4 Claims. (Cl. 286—11.16)

This invention relates generally to fluid sealing barriers for shafts and more particularly to fluid sealing barriers around rotating shafts wherein constant or variable pressure differentials are maintained on opposite sides of the sealing barriers.

The use of such shaft seals has heretofore presented several difficulties since the shaft tends to move in two directions while rotating. The shaft tends to move longitudinally, for example, due to changes in temperature and end play in its bearings; and the shaft tends to move radially because of the changes in temperature and bearing run-out, i.e. the loose fitting or play in the bearings. With the seals, as known heretofore, the amount of radial and axial movement of the shaft was limited by the amount of deflection which the sealing member could withstand. Additional difficulties have been encountered in balancing the seal with respect to pressure diffierentials across the seal, and destructive frictional temperatures have been generated due to such unbalances across the seal so that the maximum effective pressure which could be sealed was quite low. Other problems have been encountered also due to attacks by corrosive seal fluids or media.

An object of this invention, therefore, is to provide a seal for a rotating shaft which will permit little if any leakage from one side of the seal to the other while permitting relatively large amounts of radial and axial shaft movement. Another object is to provide a shaft seal with a floating member having a flexible lip yieldably urged into engagement with the shaft.

A further object is to provide a seal with provision for balancing the pressure differentials thereupon.

A still further object is to provide a chemically inert shaft seal.

The invention contemplates sealing from each other the atmosphere about adjacent portions of a shaft which rotates in a housing by a novel seal having one portion adapted upon the exertion of force thereto to engage said shaft and another portion adapted upon the exertion of force thereto to engage said housing and means providing the force to cause each engagement.

The above and further objects and novel features of the invention will appear more fully from the following details described when the same is read in connection with the accompanying drawings. It is to be expressly understood, however, that the drawings are not intended as a definition of the invention but are for the purpose of illustration only.

FIG. 1 is a partial cross-section of the invention.

FIG. 2 is a partial cross-section of the floating ring of the invention shown in FIG. 1.

FIG. 3 is a partial cross-section of the urging means shown in FIG. 1.

Referring to FIG. 1 of the drawings, a rotatable shaft 12 is shown mounted in a housing 17 so that the portion of the shaft in area A may be subjected to a pressure different than the pressure in area B. Transmission of the pressure from one area to the other is prevented by the seal case 19 which is attached to the housing 17 in a fluid tight manner by an annular array of bolts 21. The seal case 19 includes a floating ring 22 and an urging means 23 therein for maintaining the ring 22 in frictional contact with the seal case 19 and the shaft 12 to provide a seal for the differential pressures.

Seal case 19 is located in the housing 17 by shoulders 24 and 25. A gasket 27 between seal case 19 and housing 17 prevents any leakage between their joints. Seal case 19 is conviently formed of two substantially annular members 29 and 31 which are connected to each other by an annular array of bolts 33 thereby providing an open area or chamber C for ring 22 and urging means 23. A locating pin 34 may be used to locate the annular members 29 and 31 with respect to each other for ease of assembly. A locking pin 37 projecting from element 29 prevents the rotation of ring 22 with shaft 12.

Although the composition of the seal member 22 is in no way limited to any one material, it has been found advantageous to utilize glass filled Teflon. The low coefficient of friction of Teflon makes it a suitable material for a frictional seal because in some applications the amounts of lubrication between the frictional surfaces of the seal members may be marginal between the frictional surfaces of the seal members. In addition, Teflon is chemically inert to most common seal media. Teflon has an approximate operating range of from −65° F. to +400° F. If greater temperature ranges are encountered, some other material or combinations of materials may be used. Another desirable quality of Teflon is that it has a low modulus of elasticity which allows it to conform to the surface it contacts with small urging forces, however, compared to a wide variety of standard seal elastomers such as leather, glass filled Teflon is a relative stiff material and requires that the lip seal design compensate for the stiffness with thick and thin portions in order that the best sealing characteristics may be obtained and this is done in the manner described hereinafter. Another reason for the novel configuration of the invention to be described hereinafter is the fact that glass filled Teflon has a very high thermal coefficient of expansion compared to steel which necessitates a floating seal ring which may compensate for differences in expansion and contractions over wide temperature ranges. Other parts of the seal to be described hereinafter are also advantageously made with glass filled Teflon. It is to be noted also that Teflon is easily handled and formed with little danger of breakage.

The floating ring 22 is slipped on the shaft and is substantially circular so as to surround the shaft 12. One side 38 of ring 22 is flat so as to contact the sealing element 29 of seal case 19 and maintain a positive seal therewith. A circular groove 39 is formed in this flat surface 38, and radial vents 41 are disposed in an annular array extending away from the groove 39 so as to maintain the same pressure in groove 39 as in chamber C (also the same pressure as in area B). Thus, groove 39 and vents 41 reduce the amount of frictional forces between the ring 22 and the seal case 19 that can be caused by a pressure differential across the ring 22. These reduced frictional forces permit the ring 22 to reciprocate in a radial direction i.e. so as to follow the eccentric movements of the shaft 12 while still maintaining a positive seal between the ring 22 and the seal case 19. In addition to allowing relatively large amounts of radial movement of shaft 12 while still maintaining a positive seal between the ring 22 and the seal case 19, a portion of the ring 22 has an axial extension or lip 43 with a thin and a thick cross-sectional area so that the thin cross-sectional area 45 deflects against the shaft 12 so as to maintain a positive seal therewith while allowing substantially unlimited axial movement of the shaft 12 and the thick cross-sectional area 47 tends to resist deflection. The thick section 47, for example, may be so formed that the side 48 makes about a 51° angle with the axis of the shaft 12, and the thin section may be so formed that the side 49 makes about a 15° angle with the axis of the shaft 12.

Described in another manner, the right circular conical surface in which side 48 lies has a central cone angle of about 102° while the right circular central cone angle of the conical surface in which side 49 lies is about 30°. The purpose of the two different angles of the lip 43 is to provide a thick section which gives the lip 43 a substantially rigid deflection resisting portion so that forces caused by a pressure differential across the ring 22 will be absorbed by the rigidity of that section of the ring, and a thin section which gives the lip 43 an easily deflectable portion having a small frictional contacting surface with the shaft 12 so that frictional temperatures between the lip and the shaft are maintained at a minimum. The surface 50 of floating ring 22 is cut at about a 6° angle to the axis of the shaft 12 so that only a small area of the thin cross-section of the lip 43 contacts the shaft 12.

When a pressure differential exists such that the pressure at area B is greater than the pressure at area A, that pressure additionally tends to seat the ring 22 against the element 29 of seal case 19 and the shaft 12; and when no pressure differential exists, urging means 23 alone brings the floating ring 22 into sealing contact with the seal case 19 and the shaft 12.

The urging means 23 includes a split ring 53 advantageously made with glass filled Teflon and a circumferential spring 55 arranged so that the split ring is wedged between the floating ring 22 and the seal case 19 by the spring 55. This ring 53 is split for ease of assembly and has one angular frictional surface 61 whose angle is complementary to that of the surface 45 of the ring 22 thereby providing substantially uniform mating areas and another angular surface 63 whose angle is complementary to surface 48 of the lip 43 so as to provide another substantially uniform mating surface. The circumferential spring 55 rests in a groove 65 in ring 53. This spring 55 together with the ring 53 which is wedged against the seal case 19 provides two components of force against the floating ring 12, i.e., the surface 63 provides one component through surface 48 to hold the ring 22 in frictional sealing contact with the element 29 of seal case 19 and the surface 61 provides a second component against surface 49 to deflect the portion of the lip 43 which is of thin cross-section against the shaft 12 in the manner of forces applied by wedges. To this end, when there is a pressure differential across the ring 22 between locations A and B, the thick part of the lip 43 underneath surface 48 resists deflection by the pressure differential and the thin cross-section under surface 49 is resilient to the pressure differential so that the thin section is thereby deflected against the shaft 12. When there is no pressure differential across the ring 22 between locations A and B, the split ring 53 deflects the thin cross-section of the lip 43 under surface 49 so as to maintain the lip 43 in frictional sealing contact with shaft 12 and the wedge action of the sealing ring 13 and the seal case 19 maintains the ring 22 in frictional sealing contact with the element 29 of seal case 19. It is to be noted that the element 31 of seal case 19 confines the split wedge ring 53 so that the spring 55 may provide the wedging action against the surfaces 48 and 49 of the floating ring 22 and the ring 53 is free to move radially inside the seal case 19 to allow for expansion and contraction caused by temperature changes. It is to be noted also that pressure in chamber C is always the same as at location B because the split in ring 53 freely transmits pressure between location B and chamber C.

This novel invention provides a fluid barrier which has the advantages of chemical inertness, low coefficient of friction and low modulus, a simple configuration which may be formed easily thus avoiding breakage and damage due to handling, which has the advantage of allowing relatively large amounts of axial and radial shaft movement while still maintaining a positive seal by providing a two-piece lip ring with a floating member free to follow the radial movements of the shaft, this floating member being advantageous because it is balanced to reduce the frictional forces encountered when there is a large pressure differential across the seal and this member also being advantageously formed with two angles so that a relatively rigid pressure resisting part is provided and a relatively resilient part of thin cross-section is provided which is easily deflected, and further a split ring is provided which has the advantage that it is formed with force concentrating surfaces which mate with angled surfaces of the floating ring so that a circumferential spring may provide forces alone or in combination with forces caused by pressure differentials across the ring, for urging the floating ring against the seal case and the rotating shaft.

Although the foregoing has illustrated and described the invention in detail, it is to be expressly understood that the invention is not limited thereto. Various changes can be made in the design and arrangement of the parts without departing from the spirit and scope of the invention as will now be understood by those skilled in the art.

What is claimed is:

1. In a sealing assembly adapted to close the annular space between a pair of relatively rotatable machine elements such as between a rotating shaft and its stationary housing wherein a biased sealing element is employed, the sealing element surrounding the shaft, being retained in an annular seal casing having radially-extending walls and being exposed to a relatively high pressure differential, the improvement comprising a sealing ring in the general shape of an annular ring having an annular lip portion projecting in an axial direction from the rear wall thereof toward the high pressure side of said sealing ring, said annular lip portion having a substantially cylindrical inner surface, the outer surface of said annular lip portion being a first right circular conical surface, said rear wall of said annular ring being a second right circular conical surface, the central cone angle of said first conical surface being less than 90° and the central cone angle of said second conical surface being greater than 90°, the front wall of said annular ring providing a planar sealing surface perpendicular to the axis of said shaft, and means to simultaneously provide radial loading to bias said annular lip portion into positive sealing engagement with said shaft and axial loading to bias said planar sealing surface into positive sealing engagement with a radially-extending wall of said seal casing.

2. In a sealing assembly adapted to close the annular space between a pair of relatively rotatable machine elements such as between a rotating shaft and its stationary housing wherein a biased sealing element is employed, the sealing element surrounding the shaft, being retained in an annular seal casing having radially-extending walls and being exposed to a relatively high pressure differential, the improvement comprising a sealing ring in the general shape of an annular ring having an annular lip portion projecting in an axial direction from the rear wall thereof toward the high pressure side of said sealing ring, the radius of the portion of the inner circumference of said annular ring adjacent said annular lip portion being equal to the radius of the inner circumference of said annular lip portion, the outer surface of said annular lip portion being a first right circular conical surface, said rear wall of said annular ring being a second right circular conical surface, the central cone angle of said first conical surface being less than 90° and the central cone angle of said second conical surface being greater than 90°, the front wall of said annular ring providing a planar sealing surface perpendicular to the axis of the shaft, and means to simultaneously provide radial loading to bias said annular lip portion into positive sealing engagement with said shaft and axial loading to bias said planar sealing surface into positive sealing engagement with a radially extending wall of said seal casing.

3. In a sealing assembly adapted to close the annular space between a pair of relatively rotatable machine elements such as between a rotating shaft and its stationary housing wherein a biased sealing element is employed, the sealing element surrounding the shaft, being retained in an annular seal casing having radially-extending walls and being exposed to a relatively high pressure differential, the improvement comprising a one-piece sealing ring in the general shape of an annuular ring having an annular lip portion projecting in an axial direction from the rear wall thereof toward the high pressure side of said sealing ring, said annular lip portion having a substantially cylindrical inner surface circumjacent the shaft, the outer surface of said annular lip portion being a first right circular conical surface, said rear wall of said annular ring being a second right circular conical surface, the central cone angle of said first conical surface being less than 90° and the central cone angle of said second conical surface being greater than 90°, the front wall of said annular ring providing a planar sealing surface perpendicular to the axis of said shaft, a split wedge ring and a spring extending around the circumference of said split wedge ring, said wedge ring having a first frictional surface conforming to and contacting said first conical surface and a second frictional surface conforming to and contacting said second conical surface to simultaneously provide radial loading to bias said annular lip portion into positive sealing engagement with said shaft and axial loading to bias said planar sealing surface into positive sealing engagement with a radially-extending wall of said seal casing.

4. In a sealing assembly adapted to close the annular space between a pair of relatively rotatable machine elements such as between a rotating shaft and its stationary housing wherein a biased sealing element is employed, the sealing element surrounding the shaft, being retained in an annular seal casing having radially-extending walls and being exposed to a relatively high pressure differential, the improvement comprising a one-piece sealing ring in the general shape of an annular ring having an annular lip portion projecting in an axial direction from the rear wall thereof toward the high pressure side of said sealing ring, said annular lip portion having a substantially cylindrical inner surface circumjacent the shaft, the outer surface of said annular lip portion being a first right circular conical surface, said rear wall of said annular ring being a second right circular conical surface, the central cone angle of said first conical surface being about 30° and the central cone angle of said second conical surface being about 102°, the front wall of said annular ring providing a planar sealing surface perpendicular to the axis of said shaft, a split wedge ring and a spring extending around the circumference of said split wedge ring, said wedge ring having a first frictional surface conforming to and contacting said first conical surface and a second frictional surface conforming to and contacting said second conical surface to simultaneously provide radial loading to bias said annular lip portion into positive sealing engagement with said shaft and axial loading to bias said planar sealing surface into positive sealing engagement with a radially-extending wall of said seal casing.

References Cited in the file of this patent

UNITED STATES PATENTS

| | | |
|---|---|---|
| 976,369 | Huhn | Nov. 22, 1910 |
| 1,850,566 | Roed | Mar. 22, 1932 |
| 1,938,648 | Victor et al. | Dec. 12, 1933 |
| 2,186,537 | Salisbury | Jan. 9, 1940 |
| 2,647,771 | Grobel | Aug. 4, 1953 |
| 2,707,118 | Swartz et al. | Apr. 26, 1955 |
| 2,742,306 | Kelso et al. | Apr. 17, 1956 |
| 2,772,900 | Campbell | Dec. 4, 1956 |
| 2,825,590 | Sutherland | Mar. 4, 1958 |
| 2,847,236 | Lazar | Aug. 12, 1958 |
| 2,857,184 | Mancusi | Oct. 21, 1958 |

FOREIGN PATENTS

| | | |
|---|---|---|
| 678,804 | Great Britain | Sept. 10, 1952 |
| 1,213 | Great Britain | Jan. 23, 1890 |